United States Patent
Khouri et al.

(10) Patent No.: US 7,002,905 B1
(45) Date of Patent: Feb. 21, 2006

(54) METHOD AND APPARATUS FOR PERFORMING THE REBOOTING OF A NETWORK NODE WITH MINIMAL LOSS OF NETWORK TRAFFIC

(75) Inventors: Felix Khouri, San Jose, CA (US); Henry Rivers, San Jose, CA (US); Mark Lazan, San Jose, CA (US); Samer Theodossy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/236,526

(22) Filed: Jan. 25, 1999

(51) Int. Cl.
*G06F 11/22* (2006.01)
*H04L 1/22* (2006.01)

(52) U.S. Cl. .................. 370/216; 370/242; 370/244

(58) Field of Classification Search .......... 370/216, 370/217, 218, 242, 244, 245, 250
See application file for complete search history.

(56) References Cited

U.S. PATENT DOCUMENTS

| | | | | | |
|---|---|---|---|---|---|
| 4,751,670 | A | * | 6/1988 | Hess | 701/14 |
| 4,942,575 | A | * | 7/1990 | Earnshaw et al. | 714/8 |
| 5,245,615 | A | * | 9/1993 | Treu | 714/45 |
| 5,274,646 | A | * | 12/1993 | Brey et al. | 714/49 |
| 5,313,625 | A | * | 5/1994 | Hess et al. | 714/10 |
| 6,124,802 | A | * | 9/2000 | Ozaki | 340/7.33 |
| 6,145,089 | A | * | 11/2000 | Le et al. | 714/4 |
| 6,173,386 | B1 | * | 1/2001 | Key et al. | 712/10 |
| 6,185,630 | B1 | * | 2/2001 | Simmons | 370/457 |
| 6,324,644 | B1 | * | 11/2001 | Rakavy et al. | 713/1 |
| 6,327,675 | B1 | * | 12/2001 | Burdett et al. | 714/11 |
| 6,393,582 | B1 | * | 5/2002 | Klecka et al. | 714/11 |

OTHER PUBLICATIONS

Present U.S. Appl. No.: 09/236,526, filed Jan. 25, 1999, Method and Apparatus For Performing The Rebooting Of A Network Node With Minimal Loss Of Network Traffic, p. 3, Line 33 through p. 4, Line 11.
Cisco Systems, Inc. "BPX System Hardware", manual, 1998, pp. 3-1 to 3-19, San Jose, California.

\* cited by examiner

*Primary Examiner*—Hassan Kizou
*Assistant Examiner*—Saba Tsegaye
(74) *Attorney, Agent, or Firm*—Blakely, Sokoloff, Taylor & Zafman LLP

(57) ABSTRACT

A method of managing a network switch having a processor card, including a memory and a processing unit in the processor card is described. The method includes the steps of detecting an error and determining a type of the error. Then, determining whether a threshold has been reached and performing a hitless rebuild in the processor card when the type of the error is in a first set of errors and the threshold has not been reached.

34 Claims, 4 Drawing Sheets

METHOD AND APPARATUS FOR PERFORMING THE REBOOTING OF A NETWORK NODE WITH MINIMAL LOSS OF NETWORK TRAFFIC

FIELD OF THE INVENTION

This invention relates to the field of use of network devices. More particularly, the present invention relates to method and apparatus to recover gracefully from software and hardware problems in a network switching device.

BACKGROUND

Organizations that have multiple locations with local area networks (LANs), also termed "campuses," are interconnected by one or more wide area networks (WANs). WAN connections may run over media such as analog modem, leased line, integrated services digital network (ISDN), Frame Relay, switched multi-megabit data service (SMDS), X.25 and WAN asynchronous transfer mode (ATM).

Generally, a network device such as a switch may be used in a WAN as either an "edge" device to allow clients, servers, and LANs to communicate over the WAN, or a "core"-device to make up the WAN. Typically, edge switches contain at least one interface card for communicating with the WAN (e.g., a WAN interface), and one interface card for communicating with either a client, a server, or a LAN (e.g., a LAN interface). Core switches typically only contain WAN interfaces, also referred to as "trunk cards," to connect to other core switches.

Each interface card has one or more physical ports that may send or receive data, and the switch interconnects the physical ports to allow data received on a physical port on one interface card to be switched to a physical port on another interface card. For example, a physical port on a LAN interface may be connected to any physical port on a WAN interface. Similarly, a physical port on a WAN interface may be connected to any physical port on another WAN interface. Each physical port typically is identified as a "source" port or a "destination" port, depending on whether the physical port is sending data or receiving data, respectively. Each switched port typically has a buffer for queuing data to be transmitted. For ATM, the data is segmented into "cells" and the cells are sent as bandwidth is available in a first in, first out, fashion.

Each switch plane in the switch fabric operates independently of other switch planes, with no communication among the switch planes in the switch fabric. Each switch plane individually grants requests from the set of source ports in accordance with a predetermined algorithm. When a destination port is either congested (e.g., too much traffic directed at that physical port) or unreachable (e.g., the interface card containing that physical port has suffered a malfunction), the switch plane denies the granting of requests to that destination port. The cells in the buffer of the source port is transmitted if the congestion disappears or the malfunction is fixed.

To perform the switching, a switch may contain one or more switching elements, each of which is connected to all the ports in the switch and performs the switching between the ports. In addition, each switching element has an associated scheduler that controls the timing and scheduling of the switching. Each switching element and its associated scheduler is referred to as a "switch plane." Together, the set of switch planes is collectively known as a "switch fabric."

Each switch typically includes a processor card that contains the logic and processing resources needed to control and operate the switch. The processor card typically also contains computer memory needed to store data and programs for functioning of the switch. To provide for redundancy and increase the amount of time that the switch remains operational, switches typically have at least two processor cards. One processor card operates as a "master" card and is the active processor card. One or more additional processor cards act as back-up cards and are ready to take over the switching and other functions provided by the master card if the master card suffers a failure.

Processor cards store information regarding the topology of the network and the status of the hardware in the switch, including the status of each interface card contained in the switch. This information is generally referred to as a "state table." The processor card also stores the status information for all other switch nodes in the WAN in the state table, and a routing table that contains the list of current connections and the best routes for these connections.

When a non-recoverable software error occurs in the processor unit of the active processor card, the processor has to reset the switch by clearing the computer memory. This requires the switch to rebuild the state and routing tables as these tables are lost upon reset. To rebuild the state table, the processor unit has to reset all hardware in the switch, including each interface, and then poll them after reset to synchronize them with the processor unit. In addition, the processor unit has to poll the other switch nodes in the WAN to determine their status, and build a routing table.

The process for resetting the processor card and rebuilding the state and routing tables consume an enormous amount of time as the processor has to reconstruct all the information stored by the processor card. Thus, significant service disruption occurs for the devices connected to the switch node, forcing either traffic to be rerouted around the switch node or, for the links that cannot be rerouted, traffic to be stopped for those links.

Moreover, the process of gathering information also consumes network resources, as the switch node has to communicate with other switch nodes on the network to ask for information. The other switch nodes will then have to process the request for information and respond, using valuable processor resources.

Although there is a secondary processor card that is used as a back-up, there are often times when the back-up processor card is not ready to take over control from the active card. In addition, in certain configurations, a back-up processor card does not exist. Thus, in these situations, there is not a processor card to act as a standby in case the active processor card encounters an unrecoverable software error.

SUMMARY OF THE INVENTION

A method of managing a network switch having a processor card including a memory and a processing unit in the processor card is disclosed. The method includes the step of detecting an error, determining a type of the error and whether a threshold has been reached. The method performs a hitless rebuild in the processor card when the type of the error is in a first set of errors and the threshold has not been reached.

Other features and advantages of the embodiment will be apparent from the accompanying drawings and from the detailed description which follows below.

BRIEF DESCRIPTION OF THE DRAWINGS

The system is illustrated by way of example and not limitation in the figures of the accompanying drawings in which like references indicated similar elements and in which.

DETAILED DESCRIPTION

In order to minimize loss of functionality of a network switch due to a re-initialization of the processor cards (reboot) in the switch from a software error, the system protects selected portions of the volatile memory that is contained in the processor card from being cleared upon a reboot. This protected memory contains information such as routing and state tables, which typically requires a long time to reconstruct if cleared. In cases where the errors are non-recoverable even from a reboot, then the system may optionally enter into a degraded mode.

It is therefore an intended advantage of an embodiment of the system to minimize the amount of time for initialization of the switch node due to a unrecoverable software error.

It is a further intended advantage of an embodiment of the system to reduce the amount of reconfiguration and rebuilding of state and routing tables due to an initialization of the switch node.

These and other advantages of the system are provided by protecting the state and routing tables from being cleared or deleted during the memory initialization of the switch node.

Figure 1:
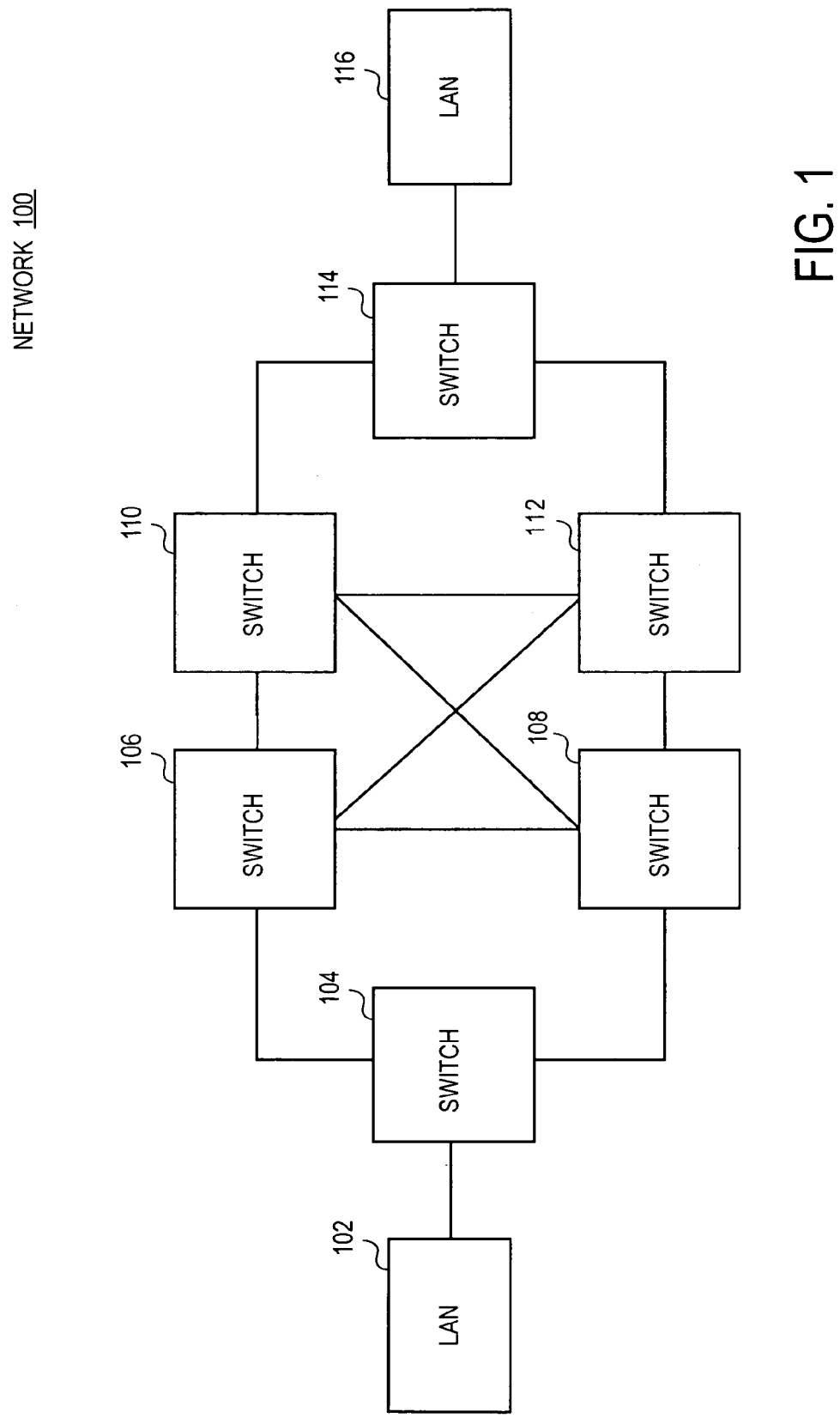
FIG. 1 is a block diagram of a network in which a network switch configured in accordance with one embodiment of the system may be used.

FIG. 1 contains a block diagram of a network 100 in which a network switch configured in accordance with one embodiment of the system may be implemented. Network 100 contains a first local area network (LAN) 102 connected to a first switch 104. First switch 104 is itself connected to a second switch 106 and a third switch 108. Second switch 106 and third switch 108 are interconnected with a fourth switch 110 and a fifth switch 112, which in turn are connected to a sixth switch 114. Sixth switch 114 is coupled to a second LAN 116.

For other embodiments, there may be any number of switch nodes in network 100, including as few as a single switch node, and the actual number of switch nodes in any network are an implementation consideration. One embodiment of the system is practiced at the switch level, and may be used in every single switch in network 100. In addition, there may be multiple LAN's coupled to first switch 104 and sixth switch 114.

Figure 2:
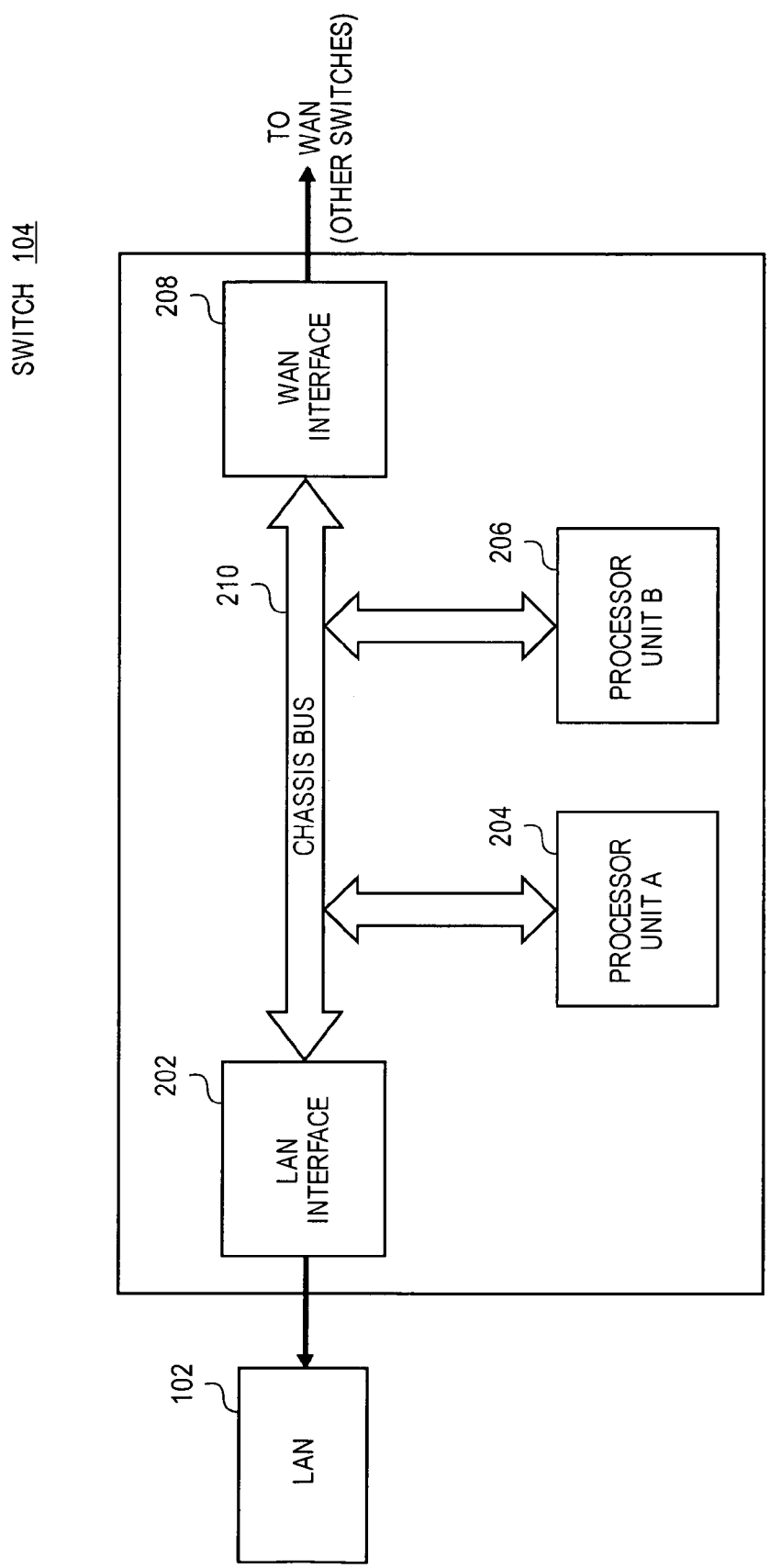
FIG. 2 is a block diagram of a network switch configured in accordance with one embodiment of the system.

FIG. 2 is a block diagram of switch 104, which contains a LAN interface 202, a processor unit A 204, a processor unit B 206, and a WAN interface 208. LAN interface 202, processor unit A 204, processor unit B 206, and WAN interface 208 are coupled for communication using a chassis bus 210.

Chassis bus 210 may carry both data and control signals for each of the connected bus devices. For one embodiment, chassis bus 210 is a control bus only and all data is sent over a separate data bus (not shown).

LAN interface 202 is configured to couple to local area networks, such as a network implemented using the Institute of Electrical and Electronic Engineers (IEEE) 802.3 standard (i.e., Ethernet), published July 1996. For other embodiments, multiple interface cards may be used to interface with different networks. Other interfaces may be used in place of or in addition to LAN interface 202 for interfacing with other types of networks and data. For example, another interface card (not shown) may be used to allow switch 104 to interface with a public branch exchange (PBX) to carry voice and facsimile data.

WAN interface 208 is used to couple switch 104 to the other switches in the WAN. For one embodiment, WAN interface 208 provides connectivity for switch 104 to ATM networks or frame relay networks and allows switch 104 to switch ATM cells or frame relay traffic at various speeds (T1, T3, OC-3, etc.).

Processor unit A 204 and processor unit B 206 controls the operation of the switching hardware (not shown) of switch 104. In operation, one processor unit is the active processor unit and the other processor unit is the back-up or standby processor unit. Processor unit A 204 is further described below. Processor unit A 204 and processor unit B 206 are similarly configured. Thus, the description for processor unit A 204 may be applied to processor unit B 206.

Figure 3:
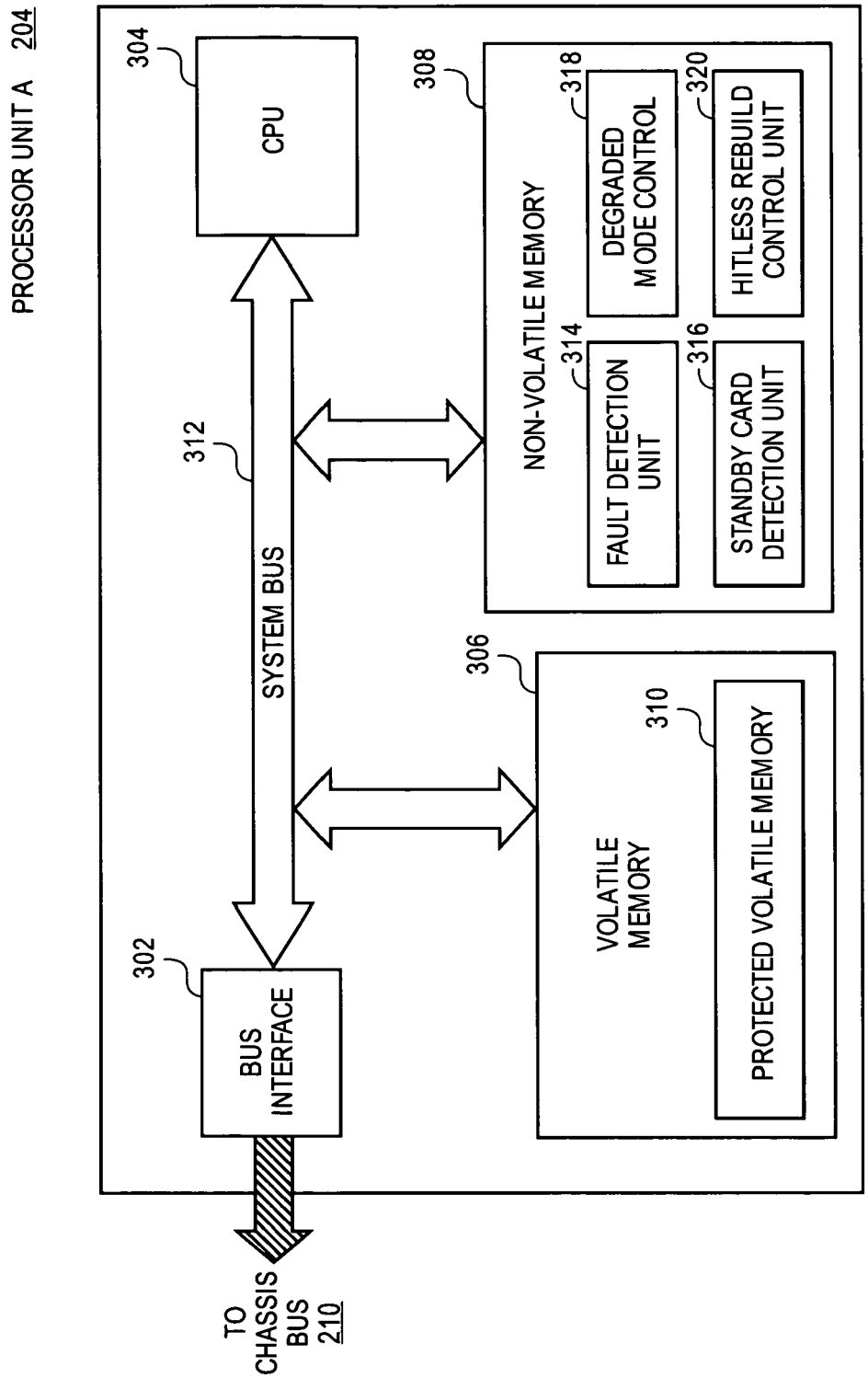
FIG. 3 is a block diagram of a processor card that is contained in the network switch of FIG. 2.

FIG. 3 is a block diagram of processor unit A 204, which contains a bus interface 302, a central processing unit (CPU) 304, a volatile memory 306, and a non-volatile memory 308 coupled to a system bus 312. Bus interface 302, central processing unit (CPU) 304, volatile memory 306, and non-volatile memory 308 communicate over system bus 312. Volatile memory 306 also contains a protected volatile memory 310.

CPU 304 is responsible for executing the system software and performing management functions to coordinate the operations of the other interface cards in switch 104. For one embodiment, CPU 304 is a general purpose processor configured to execute the instructions which are stored in non-volatile memory 308 and volatile memory 306. For another embodiment, CPU 304 may be a application specific processor optimized for executing the instructions in memory.

Non-volatile memory 308 may be an electronically erasable programmable read only memory (EEPROM) such as a flash EEPROM. Non-volatile memory 308 may also be a memory technology such as a battery-backed random access memory (BRAM). For one embodiment, non-volatile memory 308 may be implemented with different types of non-volatile memory. Non-volatile memory 308 is used to store system software and new system software during an upgrade. A non-volatile copy of the configuration database, statistics, and event logs is also stored in non-volatile memory 308. Non-volatile memory 308 contains instructions that control the operation of CPU 304 in accordance with one embodiment. The code, or program instructions, contained in non-volatile memory 308 may also be replicated in volatile memory 306 either in whole or in part, to speed execution.

In addition to having instructions for the normal operation of the processor unit, the instructions also include a fault detection unit 314, a standby card detection unit 316, a degraded node control unit 318, and a hitless rebuild control unit 320.

Volatile memory 306 may be a volatile memory such as dynamic random access memory (DRAM). Volatile memory 306 is used to store a working copy of the system software and other information from non-volatile memory 308 to allow faster operation, as volatile memory access is generally faster than access to non-volatile memory. In addition, volatile memory 306 stores the state table and routing table information for processor unit A 204 in protected volatile memory 310. Protected volatile memory 310 may be protected by segmenting portion of the memory containing the information to be saved from reset by CPU 304. One embodiment would be to specifically set memory ranges in the operating system code that would not be accessible by (e.g., hidden from) CPU 304. For another embodiment, a memory management unit (not shown), would be configured to allow or disallow access to the protected memory space. Also, the information stored in protected volatile memory 310 may also be stored in non-volatile memory 308. Thus, non-volatile memory 308 would contain all configuration data as described above in addition to information such as routing tables and state table information. In such configurations, the non-volatile memory 308 may take over the functionality of protected volatile memory 310, and protected volatile memory 310 may be eliminated. In this case, the protected memory region would be the region in non-volatile memory 308 where the state table and routing table information is stored. In cases where the functions provided by protected volatile memory 310 is provided by non-volatile memory 308, the discussion regarding protected volatile memory 310 would be applicable to non-volatile memory 308.

By storing state table and routing table information in a protected memory region, CPU 304 may be prevented from erasing or deleting that information when processor unit A 204 needs to re-initialize from a non-recoverable software error. Thus, there is no need to rebuild the state table or routing table information, which would allow processor unit A 204 to recover within the minimal amount of time, most likely even before the other devices in network 100 detects that switch 104 has suffered a problem. This type of re-initialization is termed a "hitless" rebuild. For other embodiments, processor unit A 204 would immediately pass control over to the back-up processor card (e.g., processor unit B 206) even when a hitless rebuild occurs.

In situations where processor unit A 204 cannot recover even after a hitless rebuild and a back-up processor card is not available to take over, processor unit A 204 can operate in a degraded mode. For example, if processor unit A 204 performs a certain number of hitless rebuilds within a certain amount of time, a threshold is reached that will trigger a switch to the degraded mode. For one embodiment, the number of hitless rebuilds and the time they occur is stored in both non-volatile memory 308 and protected volatile memory 310. For other embodiments, this information may be stored in either non-volatile memory 308 and protected volatile memory 310.

For one embodiment, the degraded mode only allows the operation of the switch element to provide minimal switching functionality and removal of dead routes. In addition, the degraded mode does not allow the reporting of statistics of the switch mode.

Figure 4:
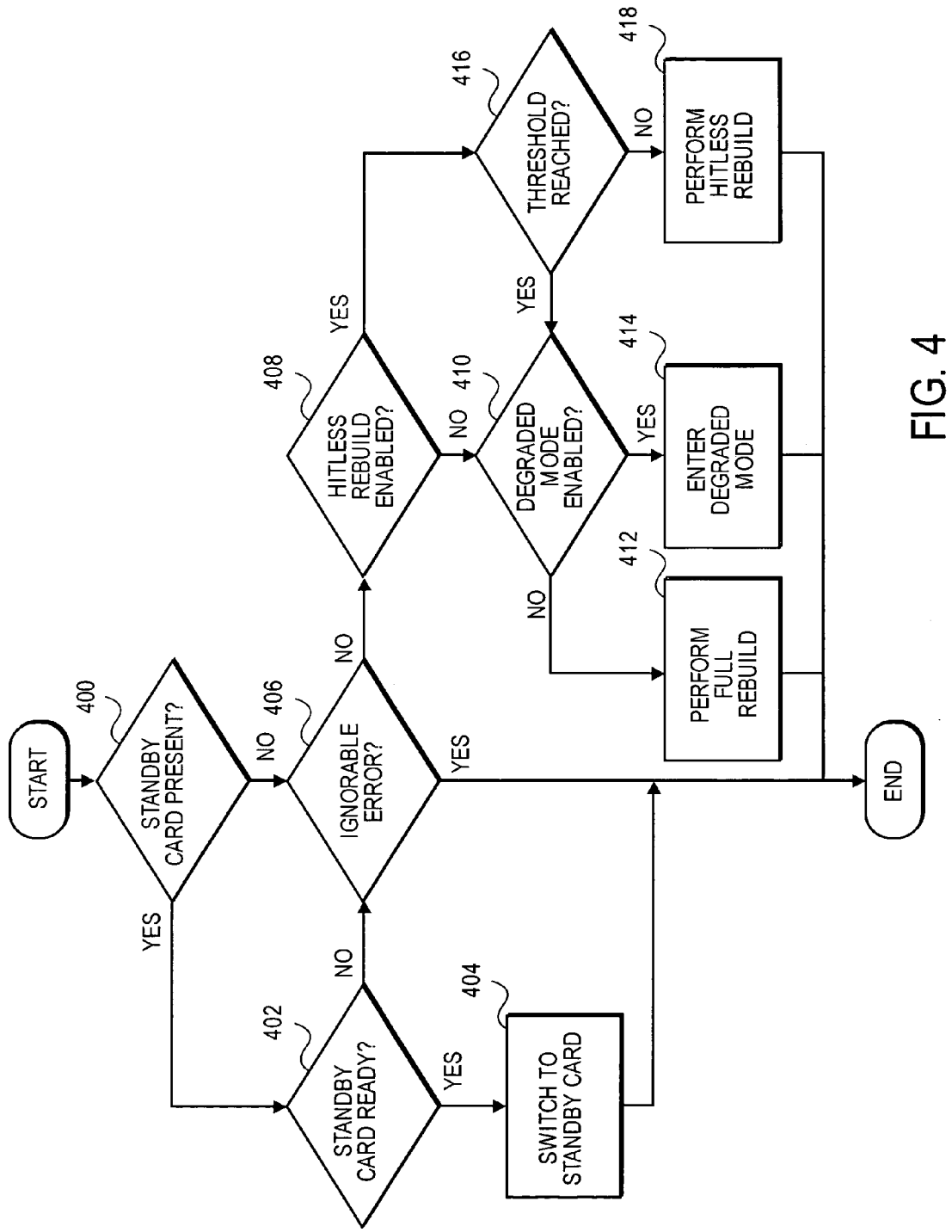
FIG. 4 is a flow diagram of the operation of the network switch when a problem occurs in the network switch.

As further described in FIG. 4, the CPU will look at certain parameters when it is booting as a result of a system re-initialization or a hitless rebuild. These parameters will allow the CPU to make the decisions needed to perform an initialization and determine which mode to operate under after an error.

The following table lists the possible actions to be taken for occurrences of problems with processor unit A 204 and processor unit B 206. Either processor unit A 204 or processor unit B 206 may be the active processor card, with the other being a standby card. The table also provides for a situation where there is only one processor unit in switch 204.

TABLE 1

Action on Active Card Problem Detection

|  | Standby Card Ready | Standby Card Updating | Standby Card Not Ready Not Updating | Standby Card State Unknown | Standby Card Does Not Exist | Standby Card in Upgrade | Standby Card State Not Applicable |
|---|---|---|---|---|---|---|---|
| Software abort/error | Switch | Hitless | Hitless | Hitless | Hitless | Hitless | N/A |
| Failed hardware error (not ignorable) | N/A | N/A | N/A | N/A | N/A | N/A | Degrade Mode |
| Failed hardware error (ignorable) | Switch | Ignore | Ignore | Ignore | Ignore | Ignore | N/A |

Software aborts includes aborts from such errors as a bad logical pointer, memory allocation errors, or an out of buffer error. Software errors include exception errors such as a write protect error, an address error, a trap error, or a bus unknown error. Ignorable hardware errors include errors such as bus communications errors, where processor unit A 204 loses connection with the other cards in switch 104.

FIG. 4 is a flow diagram of the operation of a CPU such as CPU 304, assuming that processor unit A 204 is the active processor unit, when the system encounters an error as described in the table above.

In block 400, CPU 304 determines whether a standby card is present. In this example, the standby card would be processor unit B 206. If a standby card is not present, operation will continue with block 404. Otherwise, operation will continue with block 406.

In block 402, CPU 304 determines whether or not the standby card is ready to take over. This step involves polling the standby card (e.g., processor unit B 206) to determine if it is operational. If the standby card is operational and ready to take over, then operation will continue with block 406.

Otherwise, operation will continue with block 404.

In block 404, CPU 304 will pass control of switch 104 from processor unit A 204 to processor unit B 206. Once control is passed, switch 104 should be able to operate as if no error has occurred.

Returning to block 400, if CPU 304 determines that the standby card is not present or not ready to take over, then operation will continue to 406.

In block 406, CPU 304 will determine if the error that has occurred is an ignorable error. If the error is an ignorable error, then CPU 304 will ignore the error and continue operating, as more damage could result from CPU 304 taking action on this ignorable error. If CPU 304 determines that the error is not ignorable, then operation will continue with block 408.

In block 408, CPU 304 will determine if the hitless rebuild feature has been enabled by the user. For one embodiment, whether the hitless rebuild feature is allowed to be performed is stored as a bit in non-volatile memory 308. Thus, a configurable bit may be set to indicate whether of not hitless rebuilds are to be allowable. If a hitless rebuild feature has not been enabled, then operation will continue with block 410. Otherwise, operation will continue with block 416.

In block 416, CPU 304 will determine whether a threshold has been reached. The determination of whether a threshold has been reached, for one embodiment, uses information stored in non-volatile memory 308 and includes examining whether a maximum number of hitless rebuilds has been performed within a predetermined period of time. Thus, non-volatile memory 308 stores the time of occurrence of each hitless rebuild and also stores the total number of hitless rebuilds that have occurred. Next, for another embodiment, the information regarding the number of hitless rebuilds that have occurred is also stored in protected volatile memory 310. As discussed above, this generally allows faster access to memory. If the threshold has not been reached, then operation will continue with block 418. If the threshold has been reached, then operation will continue with block 410.

In block 418, CPU 304 will initiate a hitless rebuild. As described above, during the hitless rebuild, CPU 304 will clear all portions of volatile memory 306 except for protected volatile memory 310.

In block 410, CPU 304 will determine if the degraded mode has been enabled by the user. Similar to block 408, where the hitless rebuild function can be enabled or disabled by a user, the degraded mode may be enabled or disabled by a user through the use of a bit which is stored in non-volatile memory 308 or volatile memory 306. If the degraded mode is enabled, then operation will continue with block 414. Otherwise, operation will continue with block 412.

In block 414, the user has enabled the use of the degraded mode in switch 104. Thus, CPU 304 will enter into a degraded mode, which, as discussed above, allows a CPU to provide only minimal switching functionality, such as removing dead links, switching user traffic, etc.

In block 412, if degraded mode has not been enabled, then CPU 304 will perform a full rebuild. In this process, volatile memory 306, including protected volatile memory 310, will be cleared. This will cause the processor unit A 204 to completely reset.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method of managing a network switch having a processor card including a volatile memory and a processing unit in the processor card comprising:
   detecting an error;
   determining if the error is ignorable;
   determining whether a threshold has been reached if the error is determined to be ignorable, the threshold corresponding to a number of hitless rebuilds that have occurred within an amount of time; and,
   performing a hitless rebuild in the processor card if the threshold has not been reached, the performing a hitless rebuild comprising:
      performing an initialization of the volatile memory; and,
      protecting a portion of the volatile memory from access by the processing unit during the initialization.

2. The method of claim 1, wherein the performing of the includes protecting a portion of the memory that contains a set of routing tables.

3. The method of claim 1, wherein the performing of the hitless rebuild further comprises protecting a portion of the memory that contains a set of state tables.

4. The method of claim 1, wherein the memory is accessed through a set of memory addresses and the performing of the hitless rebuild further comprises preventing the processing unit from accessing a predetermined set of memory addresses in the set of memory addresses.

5. The method of claim 1, further comprising setting the processing unit to enter into a degraded mode if the error is not ignorable and if the threshold has been reached.

6. An article comprising a machine readable medium having instructions stored thereon which, when executed, cause a method to be performed, the method comprising:
   detecting an error;
   determining if the error is an ignorable error;
   determining whether a threshold has been reached if the error is determined to be an ignorable, the threshold corresponding to a number of hitless rebuilds that have occurred within an amount of time; and,
   performing a hitless rebuild in a processor card if the threshold has not been reached, the performing a hitless rebuild comprising:
      performing an initialization of a volatile memory;
      protecting a portion of the volatile memory from access by the processing unit during the initialization.

7. The article of claim 6, wherein the method further comprises:
   protecting a portion of the memory that contains a set of routing tables.

8. The article of claim 6, wherein the method further comprises:
   protecting a portion of the memory that contains a set of state tables.

9. The article of claim 6, wherein the memory further comprises:
   preventing a processing unit from accessing a predetermined set of memory addresses in the set of memory addresses.

10. The article of claim 6, wherein the method further comprises:
   setting of the processing unit to enter into a degraded mode if the threshold has been reached.

11. A method, comprising:
  within a networking hardware apparatus:
    operating a card having volatile memory space partitioned at least into a protected memory region and a non protected memory region, said operating not diminishing the likelihood of an error within said protected memory region any more than the likelihood of an error within said non protected memory region is diminished;
    said operating, comprising experiencing an error; and,
    re-initializing software that is executed on said card, said re-initializing in response to said error, said card comprising a processor that executes said software, said protected memory region storing information that can be used by said processor to execute said software after said software has been re-initialized, said information comprising routing table information, said re-initializing not deleting said routing table information from said protected memory region, said re-initializing deleting other information from said non protected memory region.

12. The method of claim 11 wherein said protected memory region further comprises a segment of random access memory, said not deleting further comprising said processor not accessing said segment during said re-initializing for purposes of clearing said segment during said re-initializing.

13. The method of claim 11 wherein said protected memory region further comprises a segment of random access memory and said card comprises a memory management unit to manage said protected memory region, said not deleting further comprising said memory management unit not allowing access to said segment so as to prevent said segment from being cleared during said re-initializing.

14. A method, comprising:
  within a networking hardware apparatus:
    operating a card having volatile memory space partitioned at least into a protected memory region and a non protected memory region, said operating not:
      diminishing the likelihood of an error within said protected memory region any more than the likelihood of an error within said non protected memory region is diminished;
    said operating comprising experiencing an error; and,
    re-initializing software that is executed on said card, said re-initializing in response to said error, said card comprising a processor that executes said software, said protected memory region storing information that can be used by said processor to execute said software after said software has been re-initialized, said information comprising state table information, said state table information further comprising the status of an interface card located within said networking hardware apparatus, said re-initializing not deleting said status from said protected memory region, said re-initializing deleting other information from said non protected memory region.

15. The method of claim 14 wherein said protected memory region further comprises a segment of random access memory, said not deleting further comprising said processor not accessing said segment during said re-initializing for purposes of clearing said segment during said re-initializing.

16. The method of claim 14 wherein said protected memory region further comprises a segment of random access memory and said card comprises a memory management unit to manage said protected memory region, said not deleting further comprising said memory management unit not allowing access to said segment so as to prevent said segment from being cleared during said re-initializing.

17. An apparatus, comprising:
  a card for use in a networking hardware apparatus, said card comprising a processor to execute re-initializable software, said card comprising volatile memory, said volatile memory comprising a protected memory region and a non protected memory region, said protected memory region to store information that can be used by said processor to execute said re-initializable software after said software has been re-initialized, said information comprising routing table information, said re-initializable software comprising instructions for re-initializing said software in response to an error, said instructions executable by said processor, said routing table information not being deleted from said protected memory region during said re-initializing, said card not comprising:
    error preventive packaging that surrounds said protected memory region but not said non protected memory region.

18. The apparatus of claim 17 wherein said protected memory region further comprises a segment of random access memory, said processor not accessible to said segment during said re-initializing so as to prevent said protected memory region from being cleared during said re-initializing.

19. The apparatus of claim 17 wherein said protected memory region further comprises a segment of random access memory and said card further comprises a memory management unit, said memory management unit to not allow said segment to be accessed during said re-initializing for purposes of clearing said protected memory region.

20. An apparatus, comprising:
  a card for use in a networking hardware apparatus, said card comprising a processor to execute re-initializable software, said card comprising volatile memory, said volatile memory comprising a protected memory region and a non protected memory region, said protected memory region to store information that can be used by said processor to execute said re-initializable software after said software has been re-initialized, said information comprising state table information, said state table information further comprising the status of an interface card located within said networking hardware apparatus, said re-initializable software comprising instructions for re-initializing said software in response to an error, said instructions executable by said processor, said status not being deleted from said protected memory region during said re-initializing, said card not comprising:
  error preventive packaging that surrounds said protected memory region but not said non protected memory region.

21. The apparatus of claim 20 wherein said protected memory region further comprises a segment of random access memory, said processor not accessible to said segment during said re-initializing so as to prevent said protected memory region from being cleared during said re-initializing.

22. The apparatus of claim 20 wherein said protected memory region further comprises a segment of random access memory and said card further comprises a memory management unit, said memory management unit to not allow said segment to be accessed during said re-initializing for purposes of clearing said protected memory region.

23. An article comprising a machine readable medium having instructions stored thereon which, when executed, cause a method to be performed, the method comprising:

re-initializing software that is executed on a card within a networking hardware apparatus, said re-initializing in response to an error, said card comprising a processor that executes said software, said card comprising a volatile memory that stores information that can be used by said processor to execute said software after said software has been re-initialized, said information comprising routing table information, said re-initializing not deleting said routing table information from said memory because said instructions are written to be unable to invoke memory addresses for a segment of said memory where said routing table information resides so as to make said segment of said memory inaccessible during said re-initializing.

24. The article of claim 23 wherein said volatile memory further comprises dynamic random access memory.

25. An article comprising a machine readable medium having instructions stored thereon which, when executed, cause a method to be performed, the method comprising:

re-initializing software that is executed on a networking device card, said re-initializing in response to an error, said networking device card comprising a processor that executes said software, said networking device card comprising volatile memory that stores information that can be used by said processor to execute said software, said information comprising state table information, said re-initializing not deleting said state table information from said memory because said instructions are written to be unable to invoke memory addresses for a segment of said memory where said routing table information resides so as to make said segment of said memory inaccessible during said re-initializing.

26. The article of claim 25 wherein said volatile memory further comprises dynamic random access memory.

27. An apparatus, comprising:

means for re-initializing software that is executed on a card located within a networking hardware apparatus, said re-initializing in response to an error, said card comprising a processor to execute said software, said networking device card comprising volatile memory, said volatile memory comprising a non protected memory region and a protected memory region, said protected memory region to store information that can be used by said processor to execute said software after said software has been re-initialized, said information comprising routing table information, said means for re-initializing further comprising means for not deleting said routing table information from said protected memory region during said re-initializing, said card not comprising:

error preventive packaging that surrounds said protected memory region but not said non protected memory region.

28. The apparatus of claim 27 wherein said memory further comprises dynamic random access memory.

29. A method, comprising:

within a networking hardware apparatus:

operating a card having volatile memory space partitioned at least into a protected memory region and a non protected memory region, said operating not diminishing the likelihood of an error within said protected memory region any more than the likelihood of an error within said non protected memory region is diminished;

said operating, comprising experiencing an error; and, re-initializing software that is executed on a card located within said networking hardware apparatus, said re-initializing in response to said error, said card comprising a processor that executes said software, said protected memory region storing information that can be used by said processor to execute said software after said software has been re-initialized, said information further comprising state table information, said state table information further comprising network topology information, said re-initializing not deleting said network topology information from said protected memory region, said re-initializing deleting other information from said non protected memory region.

30. The method of claim 29 wherein said protected memory region further comprises a segment of random access memory, said not deleting further comprising said processor not accessing said segment during said re-initializing for purposes of clearing said segment during said re-initializing.

31. The method of claim 29 wherein said protected memory region further comprises a segment of random access memory and said card comprises a memory management unit to manage said protected memory region, said not deleting further comprising said memory management unit not allowing access to said segment so as to prevent said segment from being cleared during said re-initializing.

32. An apparatus, comprising:

a card for use in a networking hardware apparatus, said card comprising a processor to execute re-initializable software, said card comprising volatile memory, said volatile memory comprising a protected memory region and a non protected memory region, said protected memory region to store information that can be used by said processor to execute said re-initializable software after said software has been re-initialized, said information comprising state table information, said state table information further comprising network topology information, said re-initializable software comprising instructions for re-initializing said software in response to an error, said instructions executable by said processor, said network topology information not being deleted from said protected memory region during said re-initializing, said card not comprising:

error preventive packaging that surrounds said protected memory region but not said non protected memory region.

33. The apparatus of claim 32 wherein said protected memory region further comprises a segment of random access memory, said processor not accessible to said segment during said re-initializing so as to prevent said protected memory region from being cleared during said re-initializing.

34. The apparatus of claim 32 wherein said protected memory region further comprises a segment of random access memory and said card further comprises a memory management unit, said memory management unit to not allow said segment to be accessed during said re-initializing for purposes of clearing said protected memory region.

* * * * *